United States Patent [19]

Yamanaka

[11] Patent Number: 4,833,592
[45] Date of Patent: May 23, 1989

[54] MASTER STATION APPARATUS FOR REMOTE SUPERVISORY CONTROL SYSTEM WITH TOUCH PANEL VIDEO DISPLAY

[75] Inventor: Torao Yamanaka, Hyogo, Japan

[73] Assignee: Mitsubishi Denki Kabushiki Kaisha, Tokyo, Japan

[21] Appl. No.: 93,764

[22] Filed: Sep. 1, 1987

[30] Foreign Application Priority Data

Sep. 1, 1986 [JP] Japan ................. 61-203833

[51] Int. Cl.$^4$ ............................................. G06F 15/46
[52] U.S. Cl. ................................. 364/138; 340/706; 364/188
[58] Field of Search ............... 364/138, 139, 188, 189, 364/191–193, 492–495, 200 MS File, 900 MS File; 340/706, 701, 707

[56] References Cited

U.S. PATENT DOCUMENTS

| | | | |
|---|---|---|---|
| 4,303,973 | 12/1981 | Williamson, Jr. et al. | 364/189 |
| 4,396,977 | 8/1983 | Scater et al. | 364/188 |
| 4,449,186 | 5/1984 | Kelly et al. | 364/188 X |
| 4,723,207 | 2/1988 | Isobe et al. | 364/188 X |
| 4,727,473 | 2/1982 | Anderson et al. | 364/188 |

FOREIGN PATENT DOCUMENTS

| | | |
|---|---|---|
| 0043201 | 6/1980 | European Pat. Off. . |
| 3231042A1 | 8/1982 | Fed. Rep. of Germany . |
| 58-39195 | 3/1983 | Japan . |

OTHER PUBLICATIONS

H. Ng et al., "Touch-Sensitive Screens Ensure A User Friendly Interface", *Computer Design*, vol. 20, No. 8 (Aug. 1980): 135, 137.

M. Eichner et al., "Eldas-Komfortable Bedienungseinrichtung fur Leitstellen", Elektrotechnische Seitschrift E.T.A., 107, No. 3, (Feb. 1986): 118, 122, (Germany).

*Primary Examiner*—Joseph Ruggiero
*Attorney, Agent, or Firm*—Lowe, Price, LeBlanc, Becker & Shur

[57] ABSTRACT

The inventive master station apparatus for a remote supervisory control system makes poke points for selecting remote stations displayed on a video display (3) by an output control circuit (24), so that, when an operator touches one of the poke points on a touch panel (4), a CPU (21) makes the pattern and the current status of a monitored/controlled device of the corresponding remote station and a poke point for a control command displayed. When the poke point for the control command is touched, the CPU (21) transmits a control command to the monitored/controlled device of the corresponding one of remote stations (11, 12, . . . , 1n) through a line interface (5). When control of the corresponding device is executed, the remote station transmits a signal indicating the operation thereof to the master station apparatus (1). On the basis of the operation indicating signal, the CPU (21) updates the content of a status memory (23), and the status indication displayed on the video display (3) through the output control circuit (24).

18 Claims, 7 Drawing Sheets

MASTER STATION APPARATUS FOR REMOTE SUPERVISORY CONTROL SYSTEM WITH TOUCH PANEL VIDEO DISPLAY

BACKGROUND OF THE INVENTION

1. Field of the Invention

The present invention relates to a master station apparatus for a remote supervisory control system. More specifically, it relates to a master station apparatus for remotely monitoring the status of devices included in remote stations such as power stations and substations of a power system while remotely controlling a device selected at need.

2. Description of the Prior Art

A master station apparatus for a remote supervisory control system comprises a monitor panel for constantly remotely monitoring the status of devices included in remote stations and a control panel for selectively remotely on-off controlling one of the devices. In general, the monitor panel and the control panel for such a master station apparatus are provided in most suitable structure for each supervisory control system in response to the type and the scale of the system. With recent development of a general video display employing a CRT, the monitor panel can be provided in fixed hardware structure which is common to various systems. However, the control panel or a console is still prepared for each system in a custom-made manner, for the following reason:

A console in generality may be provided with alphanumeric keys so that an arbitrary remote station or device can be selected through key operation. However, designation of the remote station or device number through combination of such alphanumeric keys requires complicated operation in multiple stages. Further, a major accident may be caused by erroneous key operation for selection and control, and the probability of such erroneous key operation is extremely increased in the aforementioned selective combination of the alphanumeric keys.

This goes against basic conditions of such a console, which is mainly adapted to prevent erroneous device selection or control. Further, while it is necessary to inspect a circuit breaker or a disconnector in a remote station of, e.g., a power system with safety locking for disabling operation of the device, such safety lock processing and confirmation of the result of the processing cannot be easily performed in the aforementioned console including the alphanumeric keys.

The inventor has proposed a master station apparatus for a remote supervisory control system having a control panel of fixed hardware with no such problems in Japanese Patent Laying-Open Gazette No. 39195/1983, U.S. patent application No. 404,913 (Aug. 3, 1982) and German Patent Application No. DE3231042A1. In this master station apparatus for a remote supervisory control system, the control panel is formed by fixed hardware with a general video display and a general card reader, and selection cards corresponding to respective devices are previously prepared for remote supervisory control so that an operator can insert a card in the card reader and confirm the selection of the device by the video display, thereby to control the device.

In this master station apparatus for a remote supervisory control system, however, the operator must pick up a card for selecting the corresponding device to insert the same in the card reader for every control operation, leading to complicatedness in handling.

SUMMARY OF THE INVENTION

Accordingly, an object of the present invention is to provide a master station apparatus for a remote supervisory control system comprising fixed hardware integrating a monitor panel and a control panel, through which an operator can easily and reliably select and control a target device of a target remote station by merely touching a touch panel provided on the front surface of a video display.

According to the present invention, touch panel means is provided on the display screen of video display means to discriminate the coordinates of a position touched on the touch panel means. Status memory means stores the current status of controlled devices, and pattern memory means stores pattern data of connection or arrangement previously set in correspondence to the respective monitored/controlled devices. Symbols indicating the respective monitored/controlled devices are displayed on the video display means, and when a part of the touch panel means corresponding to one of the symbols is touched, the position coordinates thereof are read to specify the corresponding one of the monitored/controlled devices and the pattern data of the corresponding device and the symbol indicating the current status of the same are displayed on the display means. When the part corresponding to one of the displayed symbols is touched and the position coordinates thereof are discriminated, a control command is supplied to the corresponding monitored/controlled device.

Thus, according to the present invention, a target monitored/controlled device can be selected by merely touching the touch panel means, whereby complicatedness in operation can be eliminated.

In a preferred embodiment of the present invention, a plurality of monitored/controlled devices are included in remote stations, and each remote station supplies a status indication signal of the monitored/controlled device included therein to the master station apparatus in response to a control command from the same and in case of automatic status change, and the master station apparatus updates the content of the status memory means on the basis of the status indication signal.

In the preferred embodiment of the present invention, therefore, it is possible to continuously store the current status of the monitored/controlled devices in the status memory means.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
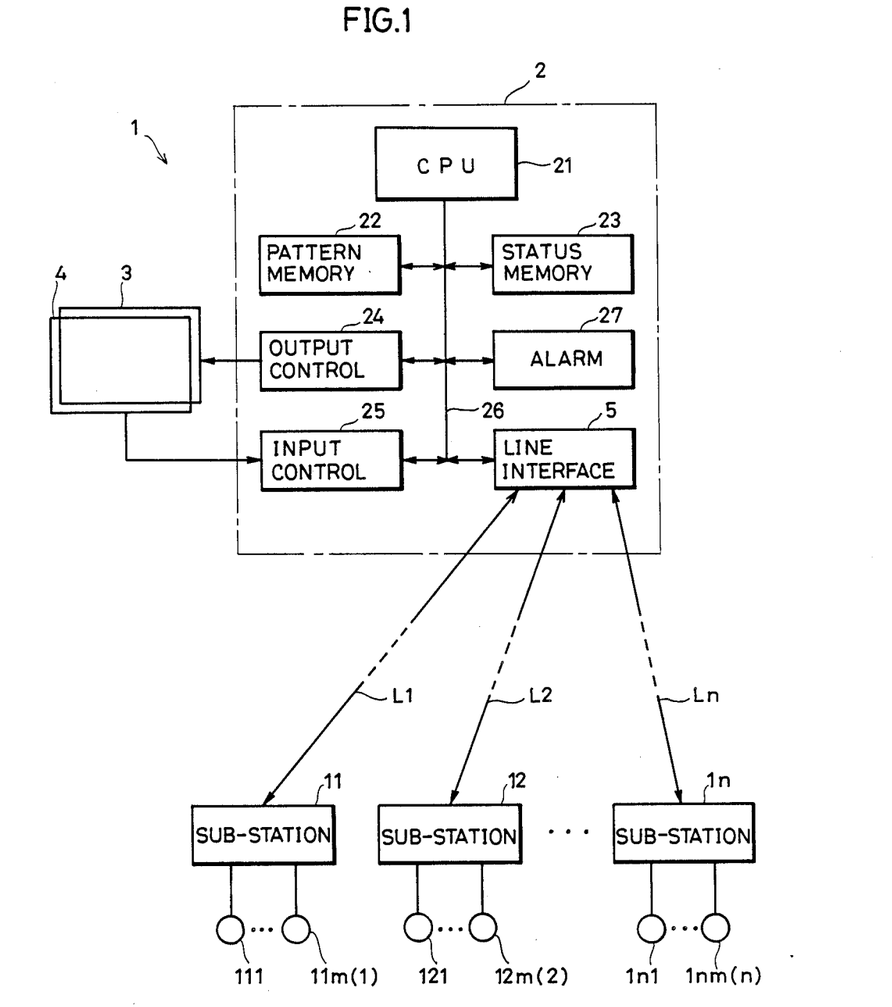
FIG. 1 is a schematic block diagram showing an embodiment of the present invention.
Figure 2:
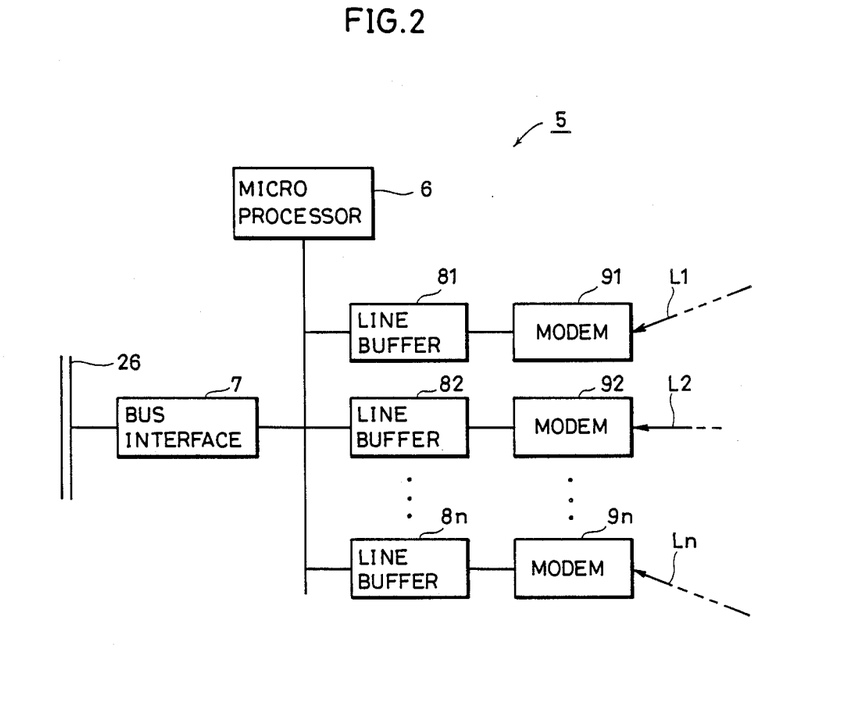
FIG. 2 is a schematic block diagram showing the structure of a line interface as shown in FIG. 1.
Figure 3:
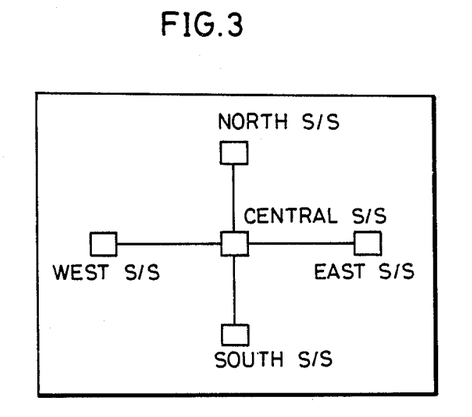
FIG. 3 illustrates exemplary display of poke points for selecting remote stations on a video display as shown in FIG. 1.
Figure 4A:
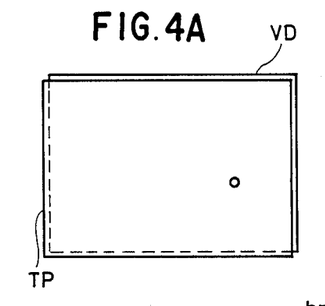
FIG. 4A illustrates exemplary structure of a touch panel.
Figure 4B:
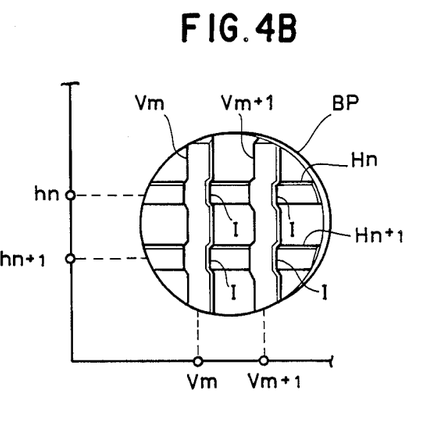
FIG. 4B illustrates detailed conductor matrix detail of FIG. 4A.

FIG. 1 is a schematic block diagram showing an embodiment of the present invention and FIG. 2 is a schematic block diagram of a line interface as shown in FIG. 1, while FIG. 3 illustrates examples of poke points for selecting remote stations displayed on a video display as shown in FIG. 1 and FIG. 4 illustrates the exemplary structure of a touch panel.

Referring to FIGS. 1 to 4, description is now made on the structure of the embodiment of the present invention. A master station apparatus 1 is connected with remote stations 11, 12, ..., 1n (where n is the total number of the remote stations) through transmission lines $L_1, L_2, \ldots, L_n$. The remote stations 11, 12, ..., 1n are connected with monitored/controlled devices 111, ..., 11m(1), 121, ..., 12m(2), ..., 1n1, ..., 1nm(n) respectively, where m(n) is the total number of the controlled apparatuses in the n-th remote station.

The master station apparatus 1 includes a control circuit 2, a video display 3 and a touch panel 4. The control circuit 2 includes a CPU 21, a pattern memory 22, a status memory 23, an output control circuit 24, an input control circuit 25, a line interface 5 and an alarm circuit 27, which are connected with each other through a data bus 26. The pattern memory 22 is adapted to store symbols of the respective remote stations 12, ..., 1n and pattern data indicating connection or arrangement of the controlled devices 111, ..., 11m(1), 121, ..., 12m(2), ..., 1n1, ..., 1nm(n) displayed on the video display 3. The status memory 23 is adapted to continuously update and store the content thereof in response to the status of the respective monitored/controlled devices 111, ..., 11m(1), 121, ..., 12m(2), ..., 1n1, ..., 1nm(n) and telemeters. The output control circuit 24 controls the display on the video display 3. The input control circuit 25 analyzes coordinate input signals of positions touched by an operator on the touch panel 4.

As shown in FIG. 2, the line interface 5 includes a microprocessor 6, a bus interface 7, line buffers 81, 82, ..., 8n and modems 91, 92, ..., 9n. The modems 91, 92, ..., 9n are connected with the transmission lines $L_1, L_2, \ldots, L_n$. These modems 91, 92, ..., 9n are adapted to perform frequency shift modulation (for example) of control command signals against noise and for convenience of transmission to transmit the same to the respective remote stations 11, 12, ..., 1n while demodulating codes transmitted from the respective remote stations 11, 12, ..., 1n to rectangular pulses. The line buffers 81, 82, ..., 8n convert bit parallel codes supplied from the microprocessor 6 into bit serial codes and add error checking codes to supply the same to the modems 91, 92, ..., 9n while converting bit serial codes transmitted from the respective remote stations 11, 12, ..., 1n through the modems 91, 92, ..., 9n into bit parallel codes while performing code error checking. The bus interface 7 is adapted to transfer data between the microprocessor 6 and the CPU 21 included in the control circuit 2 through the data bus 26.

Description is now briefly made on the operation of the line interface 5. Signals from the respective remote stations 11, 12, ..., 1n are transmitted to the master station 1 through the transmission lines $L_1, L_2, \ldots, L_n$, to reach the modems 91, 92, ..., 9n of the line interface 5. The modems 91, 92, ..., 9n demodulate the received signals to rectangular pulses, to supply the same to corresponding ones of the line buffers 81, 82, ..., 8n respectively. The line buffers 81, 82, ..., 8n convert bit serial codes of the inputted rectangular pulses into bit parallel codes while checking code errors, to supply interruption signals to the microprocessor 6 upon receiving correct codes. The microprocessor 6 reads the received codes from the line buffers providing the interruption signals, to supply the same to the bus interface 7. The bus interface 7 receiving the codes supplies interruption signals to the CPU 21 through the data bus 26.

Upon the receipt of the interruption signals, the CPU 21 receives the codes from the bus interface 7 through the data bus 26 to update the contents of the status memory 23. The data may be directly transmitted from the bus interface 7 to the status memory 23 in case that a direct memory access system is adopted.

In order to supply a control command to one of the remote stations 11, 12, ..., 1n, the CPU 21 provides the bus interface 7 with the control content and the number of the target remote station through the data bus 26. Then the bus interface 7 supplies an interruption signal to the microprocessor 6. Receiving the interruption signal, the microprocessor 6 reads the content inputted in the bus interface 7, to supply a code indicating the control content to one of the line buffers 81, 82, ..., 8n on the basis of the number of the target remote station. The line buffer supplied with the code converts the same from a bit parallel one into a bit serial one while adding an error checking code, and supplies the same to the corresponding one of the modems, which in turn performs frequency shift modulation of the code to transmit the same to the target remote station through the corresponding transmission line.

The touch panel 4 is a transparent panel which is mounted in proximity to or in close contact with the front surface of the video display 3, so that the position coordinates of a part touched by the operator are supplied to the input control circuit 25 in the control circuit 2. Referring to FIGS. 4A and 4B, description is now made on the exemplary structure of the touch panel 4. A base plate BP of a transparent insulator such as glass is provided thereon with a plurality of transparent conductors $H_n, H_{n+1}, \ldots$ in the horizontal direction and a plurality of transparent conductors $V_m, V_{m+1}, \ldots$ in the vertical direction, in the form of a matrix. Transparent insulators I are provided in intersection points between the conductors $H_n, H_{n+1}, \ldots,$ and $V_m, V_{m+1}, \ldots$ Electrodes $h_n, h_{n+1}, \ldots$ and $v_m, v_{m+1}, \ldots$ are mounted on edges of the conductors $H_n, H_{n+1}, \ldots$ and $V_m, V_{m+1}, \ldots$. The electrodes $h_n, h_{n+1}, \ldots$ are externally provided with sequential control voltage to perform scanning for checking voltage developed on the electrodes $v_m, v_{m+1}, \ldots$ so that a potential is caused by contact resistance through finger touch to enable detection of the coordinates of the touched position by scanning timing, although the electrodes are normally not in conduction.

The video display 3 may be formed by a CRT display, a liquid crystal display, a projection type television display or the like.

The video display 3 displays poke points for selecting the remote stations as shown in FIG. 3 so that, when the operator touches the poke point NORTH S/S for example, the touch panel 4 inputs the coordinates of the position displaying the poke point NORTH S/S in the input control circuit 25. The CPU 21 confirms selection of NORTH S/S from the position coordinates detected by the input control circuit 25 to read the pattern data of connection or arrangement of NORTH S/S from the pattern memory 22 and supply the same to the output control circuit 24, while reading the current status of the controlled devices of NORTH S/S from the status memory 23 to supply the same to the output control circuit 24. The output control circuit 24 displays the connection or arrangement of NORTH S/S superposing the status of the controlled devices (e.g., red in closed status and green in open status) on the video display 3.

Figure 5:
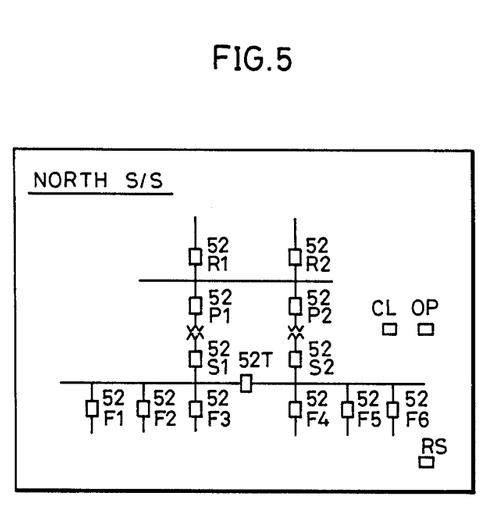
FIG. 5 illustrates examples of a remote station diagram and device status displayed on the video display as shown in FIG. 1.

FIG. 5 illustrates examples of a remote station diagram and device status displayed on the video display 3 as shown in FIG. 1. Referring to FIG. 5, symbols 52R1 and 52R2 indicate receiving breakers, symbols 52P1 and 52P2 indicate transformer primary breakers, symbols 52S1 and 52S2 indicate transformer secondary breakers, symbol 52T indicate a bus tie breaker and symbols 52F1, 52F2, . . . , 52F6 indicate feeder breakers. The symbols are displayed in red when the corresponding devices are in closed status while being displayed in green when the same are in open status. Poke points OP and CL are adapted to supply commands for switch control as hereinafter described, and a reset poke point RS is adapted to regularly return the display to the poke points for selecting the remote stations.

Figure 7A:
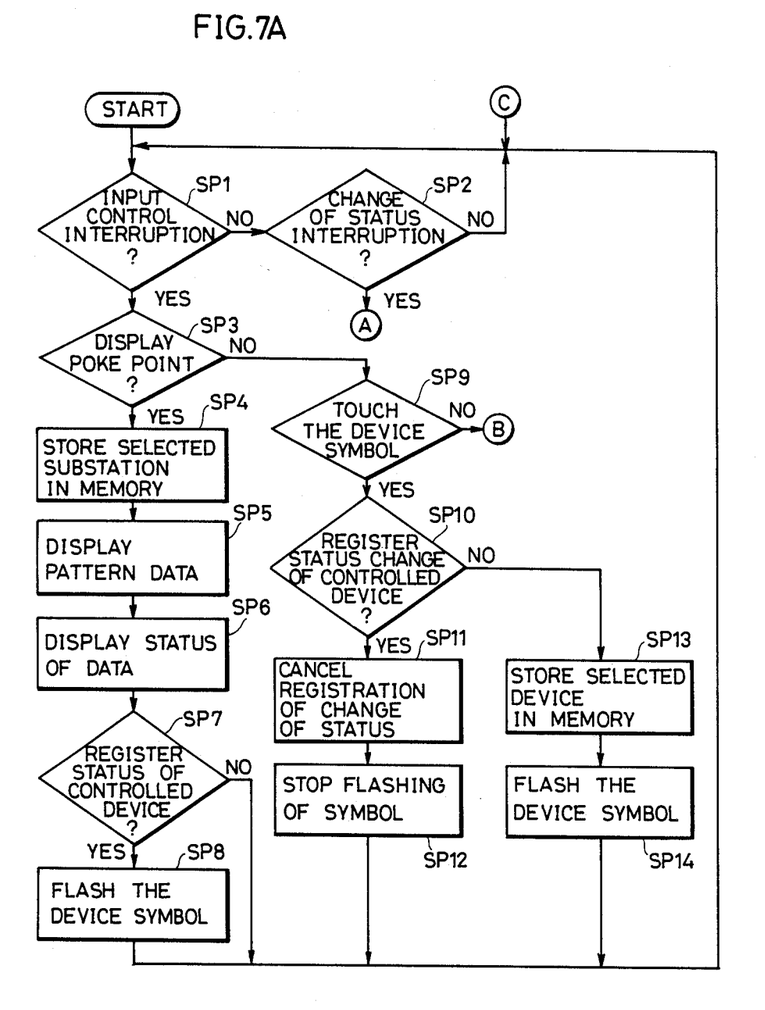
FIGS. 7A, 7B and 7C are flow charts for concretely illustrating the operation of the embodiment of the present invention.
Figure 7B:
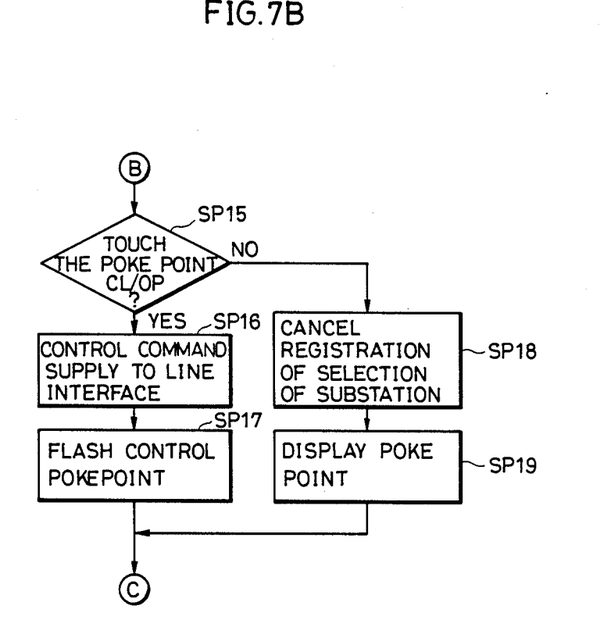
Figure 7C:
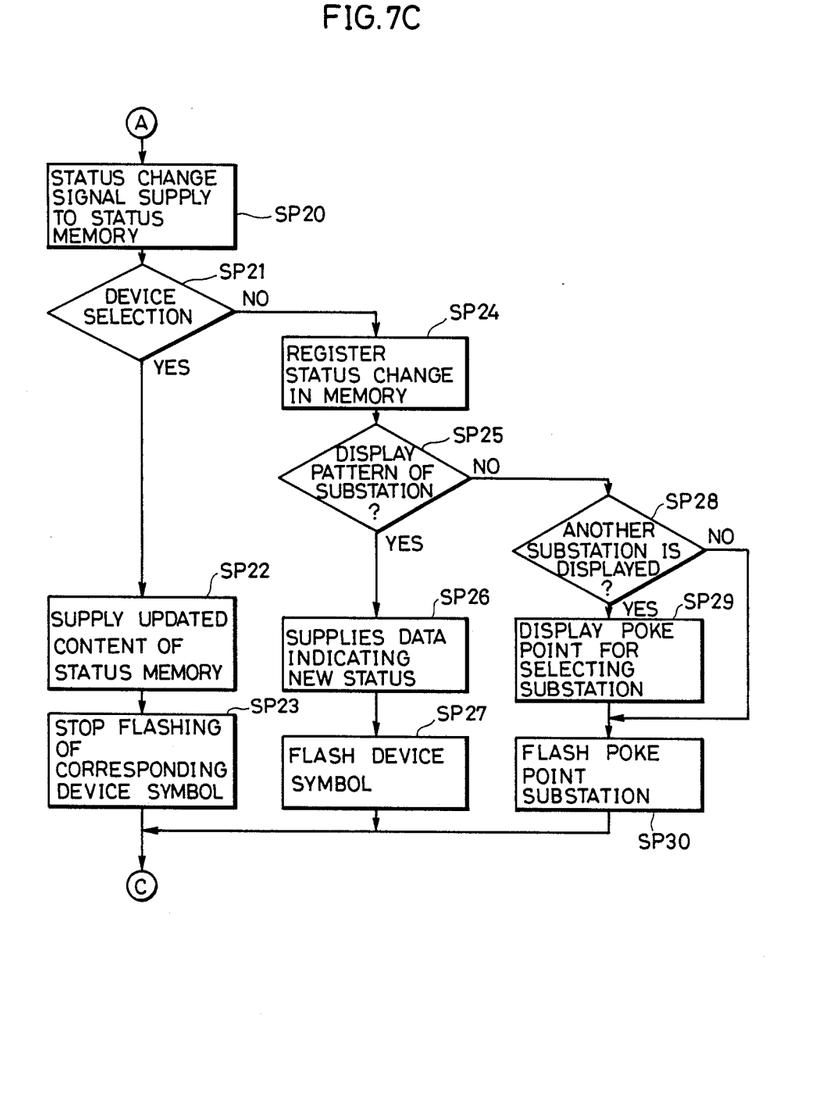

FIGS. 7A, 7B and 7C are flow charts for concretely illustrating the operation of the embodiment of the present invention.

With reference to FIGS. 1 to 5, 7A, 7B and 7C, description is now concretely made on the operation of the embodiment. At a step SP1, the CPU 21 determines whether or not an interruption signal is supplied from the input control circuit 25. If no interruption signal is supplied from the input control circuit 25, the process is advanced to a step SP2, to determine whether or not an interruption indicating some change of status is transmitted from any of the remote stations 11, 12, . . . , 1n to the line interface 5. When no such code indicating status change is received, the process is returned to the step SP1. When neither the input control circuit 25 nor the line interface 5 outputs an interruption signal, the CPU 21 repeats the operation of the steps SP1 and SP2.

When the video display 3 displays the poke points as shown in FIG. 3 and the operator touches a position of the touch panel 4, the input control circuit 25 discriminates the input coordinates of the touched position to supply the discrimination output to the CPU 21 with an interruption signal. The CPU 21 judges that the interruption signal is supplied from the input control circuit 25 at the step SP1, and the process is advanced to a step SP3. At the step SP3, a check is made as to whether or not the image displayed on the video display 3 through the output control circuit 24 is that of the poke points for selecting the remote stations. This check is made referring to the memory of a command precedingly supplied from the CPU 21 to the output control circuit 24. When the CPU 21 has confirmed at the step SP3 that the poke points for selecting the remote stations as shown in FIG. 3 are displayed, the process is advanced to a step SP4. At the step SP4, the CPU 21 discriminates the selected remote station from the coordinates of the position touched by the operator on the touch panel 4 on the basis of the output from the input control circuit 25, and stores the selection of the remote station in a memory (not shown) within the CPU 21.

At a step SP5, the CPU 21 supplies pattern data on connection or arrangement of the remote station stored in the pattern memory 22 to the output control circuit 24, to display the pattern data on the video display 3. At a step SP6, the CPU 21 provides the status of the corresponding devices of the remote station stored in the status memory 23, to display the status of the devices superposed over the pattern display of the connection or arrangement of the remote station displayed on the video display 3 at the step SP4. Then, at a step SP7, the CPU 21 makes a check on presence non presence of registration for automatic status change of the controlled devices. Such registration is made when automatic status change of the controlled devices is caused as hereinafter described. Since no such registration is present in this case, the process is returned to the step SP1.

As the result of the aforementioned operation, the video display 3 displays the pattern data on connection or arrangement of the selected remote station and the status of the monitored/controlled devices corresponding to the remote station. The display picture when the remote station NORTH S/S is selected, for example, is as shown in FIG. 5.

When, for example, the operator touches the device symbol of the receiving breaker 52R1 as shown in FIG. 5, a corresponding position coordinate signal is inputted from the touch panel 4 to the input control circuit 25, which in turn discriminates the position coordinates to supply a discrimination output signal to the CPU 21. The CPU 21 responsively judges that the output signal is supplied from the input control circuit 25 at the step SP1, and the process is advanced to the step SP3. At the step SP3, the CPU 21 judges that the pattern of connection or arrangement of the remote station is already displayed, and the process is advanced to a step SP9. At the step SP9, the CPU 21 judges that the operator touches the device symbol 52R1, and the process is advanced to a step SP10.

At the step SP10, a check is made as to whether or not registration of automatic status change of the device is made, similarly to the aforementioned step SP7. Since no automatic status change currently takes place, the process is advanced to a step SP13, at which the CPU 21 discriminates the selected device 52R1 from the position coordinates of the inputted device symbol, and registers the selection of the device 52R1 in the memory within the CPU 21. At a step SP14, the CPU 21 supplies a command signal to the output control circuit 24 for flashing the corresponding device symbol in order to inform the operator of that the selection is registered. Then the process is again returned to the step SP1.

Then, when the operator touches the poke point CL as shown in FIG. 5, the CPU 21 executes the processing of the steps SP1, SP3 and SP9 similarly to the above, while the same judges that the operator touches no device symbol at the step SP9, and the process is advanced to a step SP15 as shown in FIG. 7. At the step SP15, the CPU 21 judges that the operator touches the poke point CL, and the process is advanced to a step SP16. At the step SP16, the CPU 21 supplies the line interface 5 with a control command for closing the corresponding device of the registered remote station. The line interface 5 transmits the control command signal to the corresponding remote station. Then the process is advanced to a step SP17, at which the CPU 21 flashes the control poke point, i.e., the poke point CL in this case, to inform the operator of that the control command is transmitted to the remote station.

Then the process is again returned to the step SP1, so that the CPU 21 repeats the operation of the steps SP1 and SP2. When the control command is transmitted to the corresponding remote station and the monitored/controlled device responds to the control command, the result is transmitted as a status change signal from the remote station to the master station 1, so that the line interface 5 receives the status change signal. Receiving the status change signal, the line interface 5 supplies an interruption signal to the CPU 21. The CPU 21 responsively judges that the interruption signal is supplied at the step SP2, and the process is advanced to a step SP20 as shown in FIG. 7C. At the step SP20, the CPU 21 supplies the status change signal received by the line interface 5 to the status memory 23, to update its content.

Then the process is advanced to a step SP21. Since the target monitored/controlled device is currently under selection, the process is further advanced to a step SP22, at which the CPU 21 supplies the updated content of the status memory 23 to the output control circuit 24. At a step SP23, the CPU 21 stops flashing of the corresponding device symbol 52R1 and the control poke point CL. The selection of the remote station and the monitored/controlled device, control of the device and the result of the responsive operation thereof are confirmed by such operation.

The CPU 21 is again returned to its initial state, to repeat the operation of the steps SP1 and SP2. When the operator confirms the responsive operation of the monitored/controlled device and touches the reset poke point RS as shown in FIG. 5, the process is advanced to the steps SP1, SP3, SP9 and SP15, at which the CPU 21 judges that the poke points CL and OP are not touched and the process is advanced to a step SP18. At the step SP18, the CPU 21 cancels the registration of selection of the remote station and the monitored/controlled device. Then the CPU 21 reads data for displaying the image of the poke points for selecting the remote stations from the pattern memory 22 at a step SP19, to supply the data to the output control circuit 24 for making the video display 3 display the image of the poke points for selecting the remote stations. Then the CPU 21 is returned to its initial state.

The aforementioned operation is adapted to select and control a target device of a remote station. Description is now made on the case where automatic status change has occurred in a remote station. The CPU 21 generally repeats the operation of the steps SP1 and SP2. When status change has occurred in a remote station and an automatic status change signal is transmitted to the master station 1, the line interface 5 receives the automatic status change signal and the CPU 21 judges that an interruption signal is supplied from the line interface 5 at the step SP2, and the process is advanced to the step SP20 as shown in FIG. 7C. At the step SP20, the CPU 21 supplies the content received by the line interface 5 to the status memory 23, to update its content. Then the process is advanced to the step SP21 to check whether or not registration of device selection is made. When the result of the check is "No," the process is advanced to a step SP24.

At the step SP24, the CPU 21 registers the situation that the status change of the corresponding monitored/controlled device occurred without a control command from the master station 1, i.e., that the device status is automatically changed in the memory of the CPU 21. Then the process is advanced to a step SP25 to check whether or not the pattern of connection or arrangement of the corresponding remote station is currently displayed. When the pattern of the corresponding remote station is displayed by chance, the process is advanced to a step SP26. At the step SP26, the CPU 21 supplies the output control circuit 24 with data indicating a new status stored in the status memory 23, and then the process is advanced to a step SP27, to supply the output control circuit 24 with a command for flashing the symbol of the corresponding device.

However, such automatic status change of the monitored/controlled device rather rarely take place in the remote station whose pattern of connection or arrangement is currently displayed. In this case, the result of the check at the step 25 is "No," and the process is advanced to a step SP28. At the step SP28, the CPU 21 checks whether or not another remote station is displayed, and when no such display is made, i.e., when the poke points for selecting the remote stations are displayed, the process is advanced to a step SP30. At the step SP30, the CPU 21 flashes the poke point of the remote station causing the automatic status change. If another remote station is displayed by chance, the process is advanced to a step SP29, at which corresponding data are read from the pattern memory 22 to be supplied to the output control circuit 24 in order to display the poke points for selecting the remote stations on the video display 3, and then the process is advanced to the step SP30. At the step SP30, the poke points for selecting the remote stations are flashed and a sound is generated from the alarm circuit 27 at this time. Then CPU 21 is returned to its initial state.

The process is again returned to the step SP1 in the aforementioned manner, and in this exemplary case, the video display 3 displays the poke points for selecting the remote stations as shown in FIG. 3 and the poke point for NORTH S/S having the automatic status change is flashed.

When the operator touches the flashed poke point NORTH S/S, an interruption signal is supplied from the input control circuit 25 to the CPU 21, which in turn discriminates the interruption signal at the step SP1, and the process is advanced to the step SP3. At the step SP3, the CPU 21 judges that the remote station selecting poke points are displayed, and the process is advanced to the steps SP4, SP5 and SP6. At the steps SP4, SP5 and SP6, the CPU 21 registers the remote station selection and reads pattern data from the area of the corresponding remote station in the pattern memory 22 to supply the same to the output control circuit 24. The CPU 21 further reads data indicating the status of the corresponding monitored/controlled device from the status memory 23 to supply the same to the output control circuit 24. Then the process is advanced to the step SP7, at which the CPU 21 judges that the automatic status change is registered through the step SP24 as hereinabove described with reference to FIG. 7C, and the process is advanced to the step SP8 where the CPU 21 supplies the output control circuit 24 with a command signal for flashing the symbol of the corresponding device.

Through the aforementioned operation, the video display 3 displays the pattern of connection or arrangement of the remote station having the automatic status change as shown in FIG. 5 for example, to flash the symbol of the corresponding monitored/controlled device. If, for example, the circuit breaker 52R2 in NORTH S/S has tripped, the symbol 52R2 in FIG. 5 will be changed to green display with flashing to indicate the switched state. When the operator touches the flashed symbol 52R2, the CPU 21 discriminates an interruption signal from the input control circuit 25 at the step SP1 as shown in FIG. 7A and performs the operation of the steps SP3 and SP9, and the process is advanced to the step SP10. At the step SP10, the CPU 21 judges that the automatic status change is registered, and then cancels the registration of the automatic status change at the step SP11. Then the CPU 21 supplies the output control circuit 25 with a command signal to stop flashing of the symbol of the corresponding monitored/controlled device at the step SP12. The operator completes confirmation of the automatic status change of the corresponding monitored/controlled device 52R2 by the stoppage of flashing of the symbol.

When the operator touches the reset poke point RS as shown in FIG. 5, the CPU 21 executes the operation of the steps SP1, SP3 and SP9 and the process is advanced to the step SP15. At the step SP15, the CPU 21 judges that the poke points CL and OP are not touched, and cancels registration of remote station selection at the step SP18. The CPU 21 further reads data for displaying the remote station selecting poke points from the pattern memory 22 to supply the same to the output control circuit 24 for display on the video display 3, and is returned to its normal state.

A dedicated poke point may be independently provided to commonly confirm status change with respect to all of the controlled devices displayed on the screen to stop flashing thereof.

Although a control command is immediately transmitted to the corresponding device of the corresponding remote station when the operator touches the poke point CL or OP for switch control in the above embodiment, it is also possible to execute control operation to be performed upon confirmation thereof in consideration of importance of the control operation. Description is now made on such an embodiment.

Figure 6:
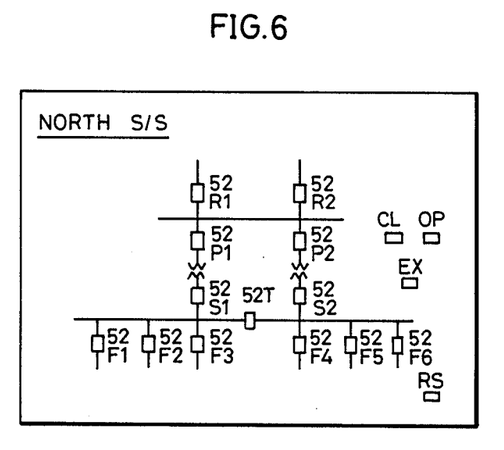
FIG. 6 illustrates other examples of a remote station diagram and device status displayed on the video display.

FIG. 6 illustrates exemplary display on a video display in another embodiment of the present invention.

The structure of FIG. 6 is different from that of FIG. 5 in that a poke point EX for indicating execution is provided under switch control poke points CL and OP. Further, no control code is transmitted immediately upon touch on the switch control poke point CL or OP but the poke point CL or OP is flashed to confirm control operation, and then the execution command poke point EX is touched to transmit a control command signal for the confirmed control operation.

Although selection of the remote station and the device is confirmed only through the control circuit 2 of the master station 1 in the aforementioned embodiment, another embodiment is possible where selection code is transmitted to the corresponding remote station and the selection is confirmed by the answer-back code.

The switch control in the aforementioned embodiment can be generally expanded to include control of halfway operation stoppage, such as voltage increase/decrease etc., as a matter of course. In this case, the third poke point SP (stop) may be added in FIG. 5 and FIG. 6, and the telemetering of the voltage etc. may be added for the reference of the operations.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A master station apparatus for a remote supervisory control system for monitoring/controlling the status of a plurality of monitored/controlled devices in remote stations, each of said monitored/controlled devices including means for transmitting information regarding the statuses of said monitored/controlled devices to said master station and for receiving control command signals from said master station, said master station apparatus comprising:

video display means;

touch panel means provided on a display screen of said video display means;

input control means for discriminating the coordinates of a position touched on said touch panel means;

status memory means for storing the respective current status of said monitored/controlled devices;

means responsive to said information regarding the status of each of said monitored/controlled device for controlling the updating of said status memory means;

pattern memory means for storing symbols previously set corresponding to respective ones of said monitored/controlled devices and pattern data representing connection or arrangement thereof; and display control means for making said video display means display, in response to the discrimination of said input control means, said respective current status information from said monitored/controlled devices stored in said status memory means, superposed with said pattern data of connection or arrangement in said pattern memory means; and line interface means for receiving from said remote stations the respective current status of said monitored/controlled device and transmitting to said remote stations the control command in response to said position touched on said part of said touch panel means corresponding to said one of said displayed symbols and said discrimination of said position coordinates by said input control means.

2. A master station apparatus for remote supervisory control system in accordance with claim 1, wherein said plurality of monitored/controlled devices are included in a plurality of remote stations, each of said remote stations including means for controlling said corresponding monitored/controlled device in response to said control command.

3. A master station apparatus for a remote supervisory control system in accordance with claim 2, wherein each said remote station includes means for supplying an operation indicating signal to said master station apparatus in response to confirmation of operation of said monitored/controlled device, said master station apparatus further including memory update means for updating the storage content of said status memory means on the basis of said operation indicating signal from said remote station.

4. A master station apparatus for a remote supervisory control system in accordance with claim 3, wherein
each said remote station includes means for judging change in the operating status of said corresponding monitored/controlled device to supply a signal indicating said change in operating status to said master station,
said memory update means includes means for updating the storage content of said status memory means on the basis of said signal indicating said change in operating status from said remote station.

5. A master station apparatus for a remote supervisory control system in accordance with claim 4, further including means for comparing operating status of each said monitored/controlled device before and after update processing of said storage content of said memory update means with each other to inform the result of comparison when said operating status are different from each other.

6. A master station apparatus for a remote supervisory control system in accordance with claim 5, wherein
said informing means includes means for flashing a symbol indicating said corresponding monitored/controlled device displayed on said video display means by said display control means.

7. A master station apparatus for a remote supervisory control system in accordance with claim 5, wherein
said informing means includes means for generating a sound.

8. A master station apparatus for a remote supervisory control system in accordance with claim 1, wherein
said display control means includes means for performing display for confirming, in response to finger touch on a part of said touch panel means corresponding to a symbol displayed on said video display means and discrimination of position coordinates of said part by said input control means, selection of said symbol.

9. A master station apparatus for a remote supervisory control system in accordance with claim 8, wherein
said means for performing said display for said confirmation includes means for flashing said corresponding symbol.

10. A master station apparatus for a remote supervisory control system in accordance with claim 8, wherein
said means for making said display for said confirmation includes means for changing the color of said corresponding symbol.

11. A master station apparatus for a remote supervisory control system in accordance with claim 1, wherein
each said monitored/controlled device includes means performing switch operation,
said status memory means includes means for storing the open/closed status of each said monitored/controlled device, and
said display control means includes means for making said video display means display respective status of said monitored/controlled devices by symbols of different colors in response to the fact that said status memory means stores the open or closed status of said monitored/controlled devices.

12. A master station apparatus for a remote supervisory control system in accordance with claim 11, wherein
said pattern memory means includes means for storing symbol data for indicating opening/closing of said monitored/controlled devices,
said display control means includes means for making said video display means display said symbols for indicating said opening/closing in display of pattern data, and
said control command transmitting means includes means for supplying a control command for opening/closing when one of said symbols for indicating opening/closing is touched in response to discrimination of position coordinates thereof by said input control means.

13. A master station apparatus for a remote supervisory control system in accordance with claim 1, wherein
said pattern memory means includes means for storing reset symbol data,
said display control means including means for making said video display means display a symbol based on said reset symbol data stored in said pattern memory means in display of said pattern data and switching display on said display means to symbols indicating respective ones of said monitored/controlled devices in response to discrimination of the position coordinates by said input control means upon finger touch on a reset symbol.

14. A master station apparatus for a remote supervisory control system in accordance with claim 1, wherein
said pattern memory means includes means for storing symbol data for indicating execution,
said display control means makes said video display means display symbols for indicating execution stored in said pattern memory means in display of said pattern data, and
said control command transmitting means includes means for supplying an execution command to a corresponding monitored/controlled device when said symbol for indicating execution is touched in response to discrimination of the position coordinates thereof by said input control means.

15. A master station apparatus for a remote supervisory control system in accordance with claim 1, wherein
said video display means includes CRT display means.

16. A master station apparatus for a remote supervisory control system in accordance with claim 1, wherein
said video display means includes a liquid crystal display.

17. A master station apparatus for a remote supervisory control system in accordance with claim 1, wherein
said video display means includes a projection type television display.

18. A master station apparatus for a remote supervisory control system for monitoring/controlling the status of a plurality of monitored/controlled devices in remote stations, each of said monitored/controlled devices including means for transmitting information regarding its status to said master station and receiving control command signals from said master station, said master station comprising:

video display means for displaying a pictorial representation of a configuration of said monitored/controlled devices including graphic symbols representing corresponding one of said monitored/controlled devices;

touch panel means provided on a display screen of said video display means;

input control means for discriminating the coordinates of a position touched on said touch panel means corresponding to locations of said monitored/controlled devices;

status memory means for storing the respective current status of said monitored/controlled devices;

means responsive to said information regarding the status of each of said monitored/controlled devices for controlling the updating of said status memory means;

pattern memory means for storing said symbols corresponding to respective ones of said monitored/controlled devices and configuration pattern data representing connection or arrangement thereof;

display control means for making said video display means display, in response to the discrimination of said input control means, said respective current status information from said monitored/controlled devices stored in said status memory means, superposed with said configuration pattern data of connection or arrangement stored in said pattern memory means; and line interface means for receiving from said remote stations the respective current status of said monitored/controlled device and transmitting to said remote stations the control command in response to said position touched on said part of said touch panel means corresponding to said one of said displayed symbols and said discrimination of said position coordinates by said input control means.

* * * * *